(12) United States Patent
Hu

(10) Patent No.: US 8,589,965 B1
(45) Date of Patent: Nov. 19, 2013

(54) METHOD FOR STOPPING SPINDLE MOTOR OF OPTICAL DISC DRIVE

(75) Inventor: Chih-Yuan Hu, Hsinchu (TW)

(73) Assignee: Philips & Lite-On Digital Solutions Corporation, Taipei (TW)

( * ) Notice: Subject to any disclaimer, the term of this patent is extended or adjusted under 35 U.S.C. 154(b) by 0 days.

(21) Appl. No.: 13/598,739

(22) Filed: Aug. 30, 2012

(30) Foreign Application Priority Data

Jun. 18, 2012 (CN) .......................... 2012 1 0201564

(51) Int. Cl.
*G11B 17/04* (2006.01)
(52) U.S. Cl.
USPC ............................................................ 720/671
(58) Field of Classification Search
USPC ............................................................ 720/671
See application file for complete search history.

(56) References Cited

U.S. PATENT DOCUMENTS

| | | | |
|---|---|---|---|
| 5,388,094 A * | 2/1995 | Park | 720/710 |
| 5,883,870 A * | 3/1999 | Akiba et al. | 720/602 |
| 7,873,968 B2 * | 1/2011 | Chu | 720/601 |
| 2006/0010457 A1 * | 1/2006 | Ohno et al. | 720/600 |

* cited by examiner

*Primary Examiner* — Mark Blouin
(74) *Attorney, Agent, or Firm* — WPAT, PC; Justin King

(57) ABSTRACT

A method for stopping a spindle motor of an optical disc drive includes the following steps. Firstly, in response to the receipt of a disabling command, the spindle motor of the optical disc drive is braked, so that a rotating speed of the spindle motor is reduced to be smaller than or equal to a predetermined rotating speed during a specified time period, wherein the predetermined rotating speed is greater than zero. Then, a preparatory stopping procedure of an optical pickup head is performed during the specified time period. Afterwards, the optical disc drive responds that the disabling command has been executed after the specified time period.

10 Claims, 5 Drawing Sheets

METHOD FOR STOPPING SPINDLE MOTOR OF OPTICAL DISC DRIVE

This application claims the benefit of People's Republic of China Application Serial No. 201210201564.2, filed Jun. 18, 2012, the subject matter of which is incorporated herein by reference.

FIELD OF THE INVENTION

The present invention relates to a method for controlling an optical disc drive, and more particularly to a method for stopping a spindle motor of an optical disc drive.

BACKGROUND OF THE INVENTION

FIG. 1 is a schematic view illustrating a conventional slim-type optical disc drive. As shown in FIG. 1, the slim-type optical disc drive comprises a tray 110, a casing 112, and two sliding rails 140, 142. After the tray 110 is pushed into the casing 112 of the optical disc drive, the tray 110 is fixed within the casing 112 by a tray locking unit (not shown). Under this circumstance, the tray 110 is in a tray-in status. Whereas, after an eject button 114 on the tray 110 is pressed by the user, the tray locking unit will release the tray 110, so that the tray 110 will be ejected out of the optical disc drive. Under this circumstance, the tray 110 is in a tray-out status. In other words, if the tray 110 is not stored within the casing 112 and the tray 110 is in the tray-out status, the tray 110 may be further pulled out along the rails 140 and 142 by the user. After the tray 110 is pulled out, the optical disc 102 loaded on the tray 110 may be replaced with a new one or and then the tray 110 is pushed into the casing 112 (i.e. in the tray-in status).

Moreover, a daughter board (not shown) is fixed within the tray 110. A main board 160 is fixed on the casing 112. The main board 160 comprises a main control circuit 162. The main board 160 and the daughter board are in communication with each other to transmit signals through a flexible cable 150. In other words, during the process of moving the tray 110, the daughter board is still in communication with the main board 160.

Please refer to FIG. 1 again. The tray 110 comprises a spindle motor 120. The spindle motor 120 is fixed on the daughter board (not shown). The optical disc 102 may be placed on the spindle motor 120. The tray 110 further comprises an optical pickup head (OPU) 130. The optical pickup head 130 further comprises an actuator control unit (not shown). The optical pickup head 130 may emit a laser beam. The focusing action, track-crossing action and track-following action of the laser beam are controlled by the actuator control unit in order to access data recorded on the tracks of the optical disc 102.

Moreover, the optical pickup head 130 may be moved on the tray 110 along the radial direction of the optical disc 102 in order to access the data recorded on any track of the optical disc 102. If the optical pickup head 130 is located close to the spindle motor 120, it means that the optical pickup head 130 is close to the inner track of the optical disc 102.

In other words, after the optical disc 102 is fixed on the spindle motor 120 and the tray 110 is pushed into the casing 112 to be in the tray-in status, the spindle motor 120 may start driving rotation of the optical disc 102. Consequently, the data of the optical disc 102 can be accessed by the optical pickup head 130.

FIG. 2 is a flowchart illustrating a method for stopping the spindle motor of the conventional optical disc drive. Once the eject button 114 of the optical disc drive is pressed, it means that the optical pickup head is about to be disabled. Meanwhile, the main control circuit 162 will sequentially perform the following steps. Firstly, the optical pickup head 130 is moved to a position corresponding to an inner track of the optical disc 102 (Step S202). Then, the actuator control unit is disabled (Step S204). Then, the laser source is turned off (Step S206). Then, the spindle motor 120 is controlled to be braked until the spindle motor 120 is stopped (Step S208). After the main control circuit 162 confirms that the spindle motor 120 is completely stopped (i.e. the rotating speed is zero), the main control circuit 162 controls the tray locking unit (not shown) to release the tray 110. Under this circumstance, the tray 110 is ejected out of the optical disc drive, and thus the tray 110 is in the tray-out status.

Basically, the above steps should be sequentially done. In a case that the tray 110 is in the tray-in status, once the eject button 114 is pressed by the user, the optical pickup head 130 is controlled to be moved to the position corresponding to the inner track of the optical disc 102 from the time spot t0 to the time spot t1 (Step S202). From the time spot t1 to the time spot t2, the actuator control unit is disabled (Step S204). From the time spot t2 to the time spot t3, the laser source is turned off (Step S206). From the time spot t3 to the time spot t4, the spindle motor 120 is controlled to be braked until the spindle motor 120 is stopped (Step S208). After the time spot t4, the main control circuit 162 confirms that the spindle motor 120 is completely stopped, and thus the main control circuit 162 controls the tray locking unit (not shown) to release the tray 110. Under this circumstance, the tray 110 is ejected out of the optical disc drive, and thus the tray 110 is in the tray-out status. From the above discussions, when the tray 110 is in the tray-out status, the optical disc drive should assure that the rotation of the optical disc 102 is completely stopped. That is, the spindle motor 120 is completely stopped. Since the optical disc 102 is no longer rotated, when the tray 110 is ejected out of the casing 112, the user will not be hurt by the optical disc 102.

In other words, the tray 110 is in the tray-in status from the time spot t0 to the time spot t4. After the time spot t4, the tray 110 is in the tray-out status. Consequently, after the eject button 114 of the optical disc drive is pressed by the user, it takes a time period (i.e. t0~t4) to wait for the tray 110 to be ejected out of the casing 112.

However, since the spindle motor of the conventional optical disc drive usually contains rare earth material, the cost of the spindle motor is very high. For reducing the fabricating cost of the optical disc drive, a spindle motor with no rare earth material is provided. For example, the spindle motor with no rare earth material is a ferrite motor.

As known, the spindle motor with no rare earth material fails to complete the braking action in a very short time. If the method for stopping the spindle motor as described in FIG. 2 is applied to this non-rare earth spindle motor, the whole cycle of ejecting the tray is very long. Under this circumstance, the optical disc drive with the non-rare earth spindle motor fails to pass the factory test, or the optical disc drive with the non-rare earth spindle motor is not user-friendly because of the long-term braking action.

SUMMARY OF THE INVENTION

The present invention provides a method for stopping a spindle motor of an optical disc drive. The spindle motor is a non-rare earth spindle motor or any other spindle motor requiring a long-term braking action because of the fabricating process or the material properties. By the method of the present invention, the cycle of ejecting the tray can be effectively reduced in order to pass the factory test.

An embodiment of the present invention provides a method for stopping a spindle motor of an optical disc drive. The method includes the following steps. Firstly, in response to the receipt of a disabling command, the spindle motor of the optical disc drive is braked, so that a rotating speed of the spindle motor is reduced to be smaller than or equal to a predetermined rotating speed during a specified time period, wherein the predetermined rotating speed is greater than zero. Then, a preparatory stopping procedure of an optical pickup head is performed during the specified time period. Afterwards, the optical disc drive responds that the disabling command has been executed after the specified time period.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
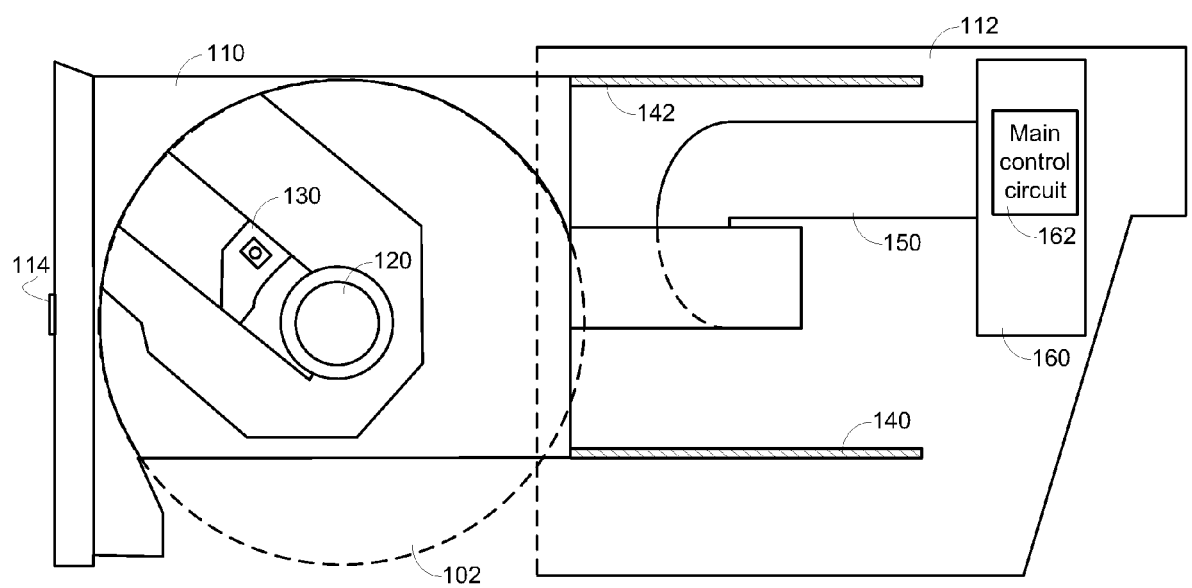
FIG. 1 (prior art) is a schematic view illustrating a conventional slim-type optical disc drive.
Figure 2:
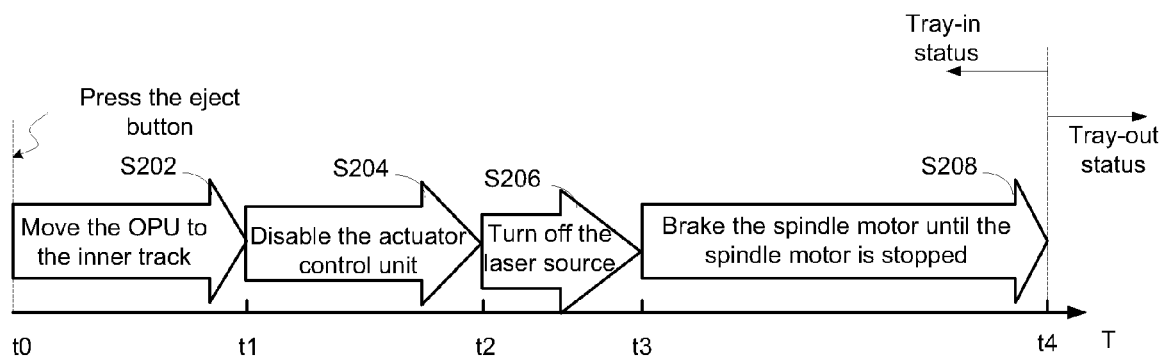
FIG. 2 (prior art) is a flowchart illustrating a method for stopping the spindle motor of the conventional optical disc drive.
Figure 3:
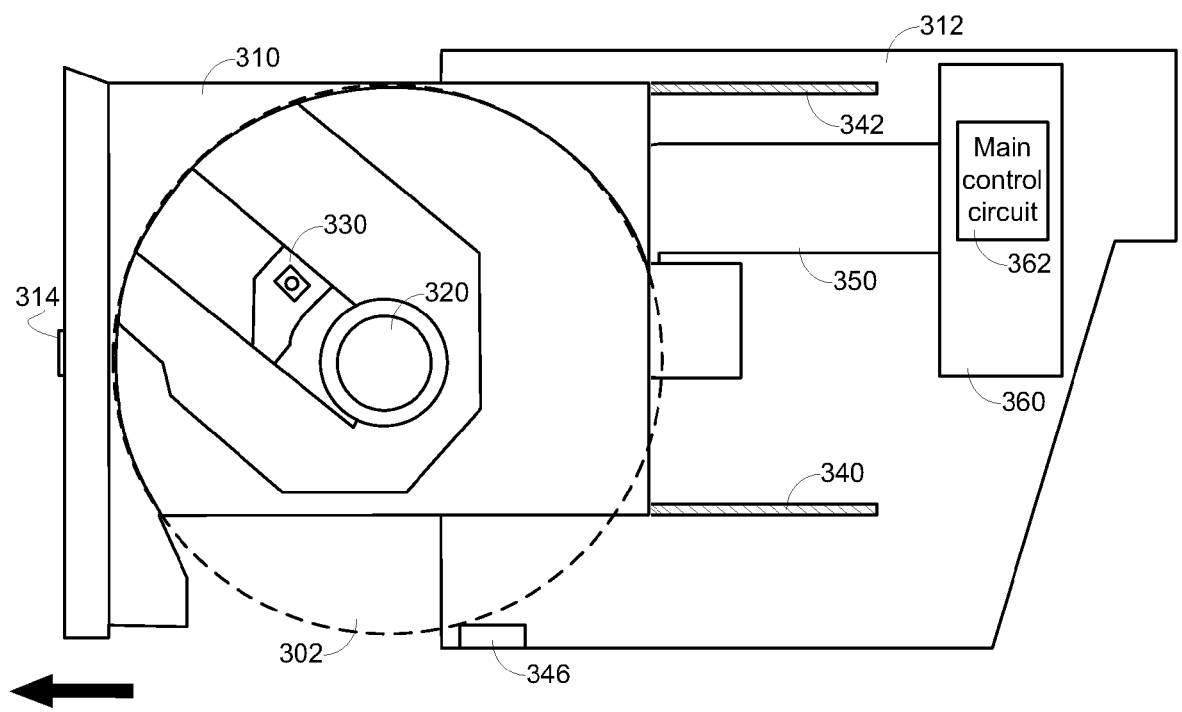
FIG. 3 is a schematic view illustrating of a slim-type optical disc drive according to an embodiment of the present invention.

FIG. 3 is a schematic view illustrating a slim-type optical disc drive according to an embodiment of the present invention. As shown in FIG. 3, the slim-type optical disc drive comprises a tray 310, a casing 312, and two sliding rails 340, 342. The tray-in status and the tray-out status are similar to those mentioned above, and are not redundantly described herein. Moreover, if the tray 310 is not stored within the casing 312 and the tray 310 is in the tray-out status, the tray 310 may be further pulled out along the rails 340 and 342 by the user. After the tray 310 is further pulled out, the optical disc 302 loaded into the tray 310 may be replaced with a new one and then the tray 310 is pushed into the casing 312 (i.e. in the tray-in status).

Moreover, a daughter board (not shown) is fixed within the tray 310. A main board 360 is fixed on the casing 312. The main board 360 comprises a main control circuit 362. The main board 360 and the daughter board are in communication with each other to transmit signals through a flexible cable 350. In other words, during the process of moving the tray 310, the daughter board is still in communication with the main board 360.

The tray 310 comprises a spindle motor 320. The spindle motor 320 is fixed on the daughter board (not shown). The optical disc 302 may be placed on the spindle motor 320. The tray 310 further comprises an optical pickup head (OPU) 330. The optical pickup head 330 further comprises an actuator control unit (not shown). The optical pickup head 330 may emit a laser beam. The focusing action, track-crossing action and track-following action of the laser beam are controlled by the actuator control unit in order to access data recorded on the tracks of the optical disc 302. In this embodiment, the spindle motor 320 is a non-rare earth spindle motor with no rare earth material. For example, the spindle motor 320 is a ferrite motor.

Moreover, the optical pickup head 330 may be moved on the tray 310 along the radial direction of the optical disc 302 in order to access the data recorded on any track of the optical disc 302. In other words, after the optical disc 302 is fixed on the spindle motor 320 and the tray 310 is pushed into the casing 312 to be in the tray-in status, the spindle motor 320 may start driving rotation of the optical disc 102. Consequently, the data of the optical disc 302 can be accessed by the optical pickup head 330.

Moreover, as shown in FIG. 3, the optical disc drive further comprises a friction-enhancing structure 346. The friction-enhancing structure 346 is located within the casing 312 and arranged beside an entrance opening of the optical disc drive. An example of the friction-enhancing structure 346 includes but is not limited to a sponge block. During the tray 310 is pulled out by the user, the friction-enhancing structure 346 may be rubbed against an edge of the optical disc 302, which is placed on the tray 310.

In this embodiment, during the braking action of the spindle motor 320 is performed, a preparatory stopping procedure of the optical pickup head 330 is also performed. Once the rotating speed of the spindle motor 320 is reduced to be smaller than or equal to a predetermined rotating speed, the tray 310 is released and thus the tray 310 is in the tray-out status. In other words, at the moment when the tray 310 is released, the spindle motor 320 still has a rotating speed.

Moreover, since the optical disc drive has the friction-enhancing structure 346, during the tray 310 is further pulled out by the user, the friction force between the optical disc 302 and the friction-enhancing structure 346 may quickly slow down the rotating speed of the optical disc 302 until the optical disc 302 is stopped.

Figure 4:
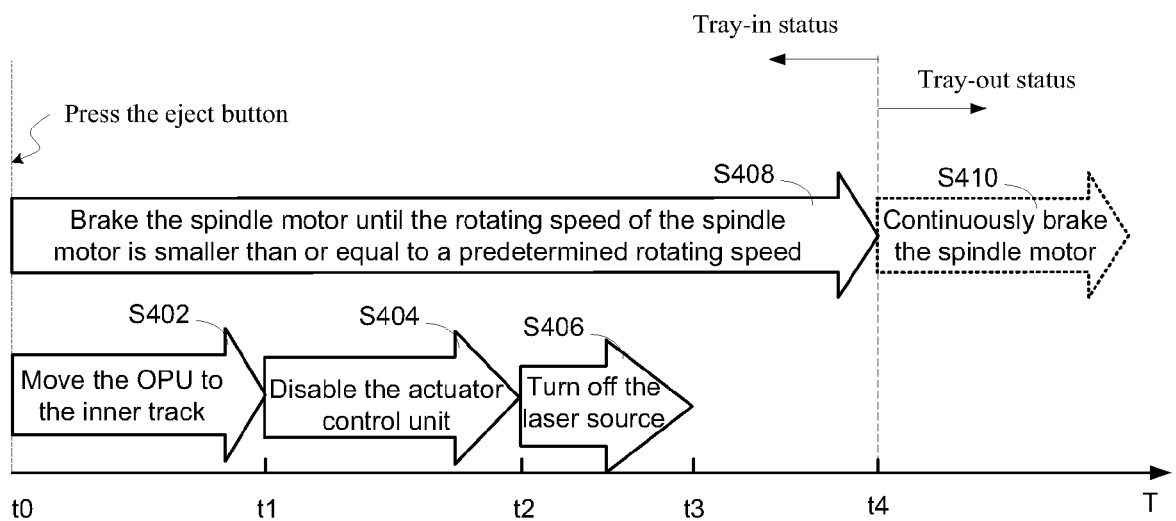
FIG. 4 is a flowchart illustrating a method for stopping a spindle motor of an optical disc drive according to an embodiment of the present invention.

FIG. 4 is a flowchart illustrating a method for stopping a spindle motor of an optical disc drive according to an embodiment of the present invention. At the time spot t0, the user presses the eject button 314 of the optical disc drive in order to disable the optical disc drive. Then, the main control circuit 362 performs a braking action of the spindle motor 320 until the rotating speed of the spindle motor 320 is reduced to be smaller than or equal to a predetermined rotating speed (Step S408).

As shown in FIG. 4, during the time period from the time spot t0 to the time spot t4, the rotating speed of the spindle motor 320 is gradually reduced to be smaller than or equal to the predetermined rotating speed. Moreover, during the time period from the time spot t0 to the time spot t4, a preparatory stopping procedure of the optical pickup head 330 is also performed. The preparatory stopping procedure of the optical pickup head 330 includes the steps of moving the optical pickup head 330 to the position corresponding to the inner track of the optical disc 302 (Step S402), disabling the actuator control unit (Step S404) and turning off the laser source (Step S406). For example, the predetermined rotating speed is 700 rpm. It is noted that the predetermined rotating speed may be varied according to the practical requirements.

In other words, during the time period of performing the braking action of the spindle motor 320, other actions are also performed. From the time spot t0 to the time spot t1, the optical pickup head 330 is controlled to be moved to the position corresponding to the inner track of the optical disc 302 (Step S402). From the time spot t1 to the time spot t2, the actuator control unit is disabled (Step S404). From the time spot t2 to the time spot t3, the laser source is turned off (Step S406). Moreover, t4 is greater than or equal to t3.

After the time spot t4, the main control circuit 362 confirms that the rotating speed of the spindle motor 320 is reduced to be smaller than or equal to the predetermined rotating speed, and thus the main control circuit 362 controls the tray locking unit (not shown) to release the tray 310. In other words, after the tray 310 is released to be in the tray-out status, the optical disc drive is completely disabled.

In this embodiment, it assumes that after ejecting the tray 310 to be in the tray-out status, the tray 310 is immediately further pulled out of the casing 312 of the optical disc drive at the time spot t4 by the user. During the process of pulling out the tray 310, the optical disc 302 rotated at the rotating speed smaller than or equal to the predetermined rotating speed is contacted with the friction-enhancing structure 346. Consequently, the friction force between the optical disc 302 and the friction-enhancing structure 346 may reduce the rotating speed of the optical disc 302 to zero. After the tray 310 is completely pulled out of the optical disc drive, the rotation of the optical disc is completely stopped.

Alternatively, if the tray 310 is not immediately pulled out of the casing 312 of the optical disc drive by the user at the time spot t4 after ejecting the tray 310 to be in the tray-out status, the main control circuit 362 may control the spindle motor 320 to be continuously braked in the tray-out status (Step S410) until the spindle motor 320 is stopped (i.e. the rotating speed is zero). Accordingly, when the tray 310 is pulled out by the user, even if the optical disc 302 is contacted with the friction-enhancing structure 346, the rotation of the optical disc 302 has been stopped. Consequently, after the tray 310 is completely pulled out of the optical disc drive, the rotation of the optical disc is completely stopped.

Alternatively, if the tray 310 is not immediately pulled out of the casing 312 of the optical disc drive by the user at the time spot t4 after ejecting the tray 310 to be in the tray-out status, the main control circuit 362 may control the spindle motor 320 to be continuously braked in the tray-out status (Step S410). Before the spindle motor 302 is braked to completely stop, if the tray 310 is pulled out of the casing 312 of the optical disc drive by the user. During the process of pulling out the tray 310, the optical disc 302 rotated at a low operating speed is contacted with the friction-enhancing structure 346. Due to the friction force between the optical disc 302 and the friction-enhancing structure 346, the rotating speed of the optical disc 302 is reduced to zero. After the tray 310 is completely pulled out of the optical disc drive, the rotation of the optical disc is completely stopped.

The method for stopping the spindle motor of the optical disc drive according to the present invention may be started when a disabling command from a computer host is received by the optical disc drive. For example, in a case that the computer host (not shown) in communication with the optical disc drive is about to enter a standby mode or a sleep mode, the computer host may issue a disabling command to the optical disc drive. In response to the disabling command, the optical disc drive implements the above method. In accordance with the present invention, the disabling command is a stop command or a speed-down command.

Figure 5:
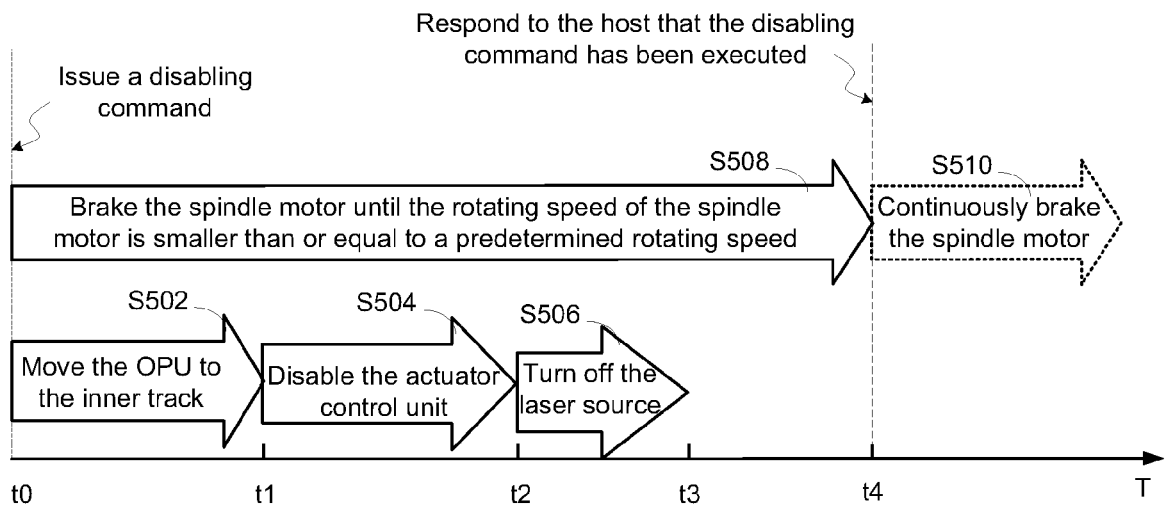
FIG. 5 is a flowchart illustrating a method for stopping a spindle motor of an optical disc drive according to another embodiment of the present invention.

FIG. 5 is a flowchart illustrating a method for stopping a spindle motor of an optical disc drive according to another embodiment of the present invention. At the time spot t0, the computer host (not shown) issues a disabling command to the optical disc drive. Then, the main control circuit 362 performs a braking action of the spindle motor 320 until the rotating speed of the spindle motor 320 is reduced to be smaller than or equal to a predetermined rotating speed (Step S508).

As shown in FIG. 5, during the time period from the time spot t0 to the time spot t4, the rotating speed of the spindle motor 320 is gradually reduced to be smaller than or equal to the predetermined rotating speed. Moreover, during the time period from the time spot t0 to the time spot t4, a preparatory stopping procedure of the optical pickup head 330 is also performed. The preparatory stopping procedure of the optical pickup head 330 includes the steps of moving the optical pickup head 330 to the position corresponding to the inner track of the optical disc 302 (Step S502), disabling the actuator control unit (Step S504) and turning off the laser source (Step S506). Moreover, t4 is greater than or equal to t3.

After the time spot t4, the main control circuit 362 confirms that the rotating speed of the spindle motor 320 is reduced to be smaller than or equal to the predetermined rotating speed, and thus the main control circuit 362 responds to the computer host (not shown) that the disabling command has been executed. That is, the main control circuit 362 responds to the computer host (not shown) that the stop command or the speed-down command has been executed.

After the time spot t4, the optical disc drive is in a waiting status of waiting for the command from the computer host. In the waiting status, the spindle motor 320 is not controlled by the optical disc drive, so that the rotating speed of the spindle motor 320 is slowly reduced to zero. Alternatively, after the time spot t4, the main control circuit 362 may control the spindle motor 320 to be continuously braked (Step S510), so that the rotating speed of the spindle motor 320 is quickly reduced to zero.

From the above discussions, the present invention provides a method for stopping a spindle motor of an optical disc drive. The spindle motor is a non-rare earth spindle motor or any other spindle motor requiring a long-term braking action because of the fabricating process or the material properties. In accordance with the present invention, during the braking action of the spindle motor is performed, a preparatory stopping procedure of the optical pickup head is also performed. Consequently, the time period after the eject button is pressed and before the tray is released will be reduced in order to pass the factory test. Moreover, since the rotating speed of the optical disc is largely reduced when the tray is in the tray-out status, the user will not be hurt by the optical disc.

Moreover, by the method of the present invention, the tray is released from the optical disc drive and the tray is in the tray-out status when the rotating speed of the spindle motor is not zero. After the tray 310 is in the tray-out status, if the tray 310 is immediately pulled out by the user, the friction force between the optical disc 302 and the friction-enhancing structure 346 may quickly reduce the rotating speed of the optical disc 302 to zero. Alternatively, if the tray 310 is not immediately pulled out by the user after the tray 310 is in the tray-out status, the spindle motor will be continuously braked until the rotating speed of the spindle motor is reduced to zero.

From the above description, the method of the present invention is applied to the situation when the tray is switched from the tray-in status to the tray-out status. It is noted that the applications of the method may be expanded while retaining the teachings of the invention. For example, in a case that the computer system needs to disable the optical disc drive, the method of the present invention may be employed to control the optical disc drive and controlling the braking action of the spindle motor.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for stopping a spindle motor of an optical disc drive, the method comprising steps of:

braking the spindle motor of the optical disc drive in response to receipt of a disabling command, so that a rotating speed of the spindle motor is reduced to be smaller than or equal to a predetermined rotating speed during a specified time period, wherein the predetermined rotating speed is greater than zero;

performing a preparatory stopping procedure of an optical pickup head during the specified time period, wherein the step of performing the preparatory stopping procedure of the optical pickup head overlaps the step of braking the spindle motor of the optical disc drive; and responding that the disabling command has been executed after the specified time period.

2. The method as claimed in claim 1, wherein the disabling command is a stop command or a speed-down command.

3. A method for stopping a spindle motor of an optical disc drive, the method comprising steps of:

braking the spindle motor of the optical disc drive in response to receipt of a disabling command, so that a rotating speed of the spindle motor is reduced to be smaller than or equal to a predetermined rotating speed during a specified time period, wherein the predetermined rotating speed is greater than zero;

performing a preparatory stopping procedure of an optical pickup head during the specified time period; and responding that the disabling command has been executed after the specified time period, wherein the preparatory stopping procedure of the optical pickup head is performed by a step of moving the optical pickup head to a position corresponding to an inner track of an optical disc, a step of disabling an actuator control unit of the optical pickup head, or a step of turning off a laser source.

4. The method as claimed in claim 3, wherein the optical disc drive further comprises an eject button and a tray, wherein once an eject button of the optical disc drive is pressed, the disabling command is received by the optical disc drive, wherein once the tray is released from the optical disc drive and the tray is in a tray-out status, the optical disc drive responds that the disabling command has been executed.

5. The method as claimed in claim 4, wherein when the tray is released from the optical disc drive, the rotating speed of the spindle motor is greater than zero.

6. The method as claimed in claim 4, wherein when the tray is released from the optical disc drive, the spindle motor is continuously braked.

7. The method as claimed in claim 4, wherein the optical disc drive further comprises a casing and a friction-enhancing structure, and an optic disc is placed on the tray, wherein the friction-enhancing structure is attached on a casing of the optical disc drive, wherein during the tray is pulled out of the optical disc drive, the friction-enhancing structure is rubbed against an edge of the optical disc.

8. The method as claimed in claim 7, wherein the friction-enhancing structure is a sponge block.

9. The method as claimed in claim 3, wherein when the optical disc drive responds that the disabling command has been executed, the rotating speed of the spindle motor is greater than zero.

10. The method as claimed in claim 3, wherein when the optical disc drive responds that the disabling command has been executed, the spindle motor is continuously braked.

* * * * *